US006928872B2

(12) United States Patent
Durante et al.

(10) Patent No.: US 6,928,872 B2
(45) Date of Patent: Aug. 16, 2005

(54) INTEGRATED GYROSCOPE OF SEMICONDUCTOR MATERIAL WITH AT LEAST ONE SENSITIVE AXIS IN THE SENSOR PLANE

(75) Inventors: Guido Spinola Durante, Gavirate (IT); Sarah Zerbini, Fontanellato (IT); Angelo Merassi, Vigevano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/443,647

(22) Filed: May 21, 2003

(65) Prior Publication Data

US 2004/0035204 A1 Feb. 26, 2004

Related U.S. Application Data

(63) Continuation-in-part of application No. 10/128,133, filed on Apr. 23, 2002, now Pat. No. 6,766,689.

(30) Foreign Application Priority Data

Apr. 27, 2001 (EP) ............................................ 01830277
May 21, 2002 (EP) ............................................ 02425320

(51) Int. Cl.[7] ........................ G01C 19/00; G01P 15/08; G01P 3/44; G01P 9/00; G01P 15/125
(52) U.S. Cl. ................................. 73/504.04; 73/514.32
(58) Field of Search ........................ 73/504.12, 504.16, 73/514.02, 514.32, 514.16, 504.02, 504.14

(56) References Cited

U.S. PATENT DOCUMENTS

| 5,275,047 A | 1/1994 | Zabler et al. ................. 73/505 |
| 5,604,312 A | 2/1997 | Lutz ......................... 73/504.14 |
| 5,635,638 A * | 6/1997 | Geen ........................ 73/504.04 |
| 5,747,690 A | 5/1998 | Park et al. ................ 73/504.12 |
| 5,780,739 A * | 7/1998 | Kang et al. .............. 73/504.16 |
| 5,792,954 A | 8/1998 | Corkum et al. .......... 73/514.32 |
| 5,945,599 A | 8/1999 | Fujiyoshi et al. ........ 73/504.12 |
| 5,955,668 A | 9/1999 | Hsu et al. ................ 73/504.12 |
| 6,089,089 A | 7/2000 | Hsu ......................... 73/504.12 |
| 6,327,907 B1 | 12/2001 | Park ........................ 73/504.12 |
| 6,349,597 B1 | 2/2002 | Folkmer et al. .............. 73/504 |
| 6,474,160 B1 | 11/2002 | Stewart et al. ........... 73/504.04 |
| 6,513,380 B2 * | 2/2003 | Reeds et al. ............. 73/504.04 |
| 2002/0134154 A1 | 9/2002 | Hsu et al. ................ 73/504.04 |

FOREIGN PATENT DOCUMENTS

| EP | 0 911 606 A1 | 4/1999 |
| EP | 1 098 170 A2 | 1/2001 |
| WO | WO 97/15066 | 4/1997 |
| WO | WO 99/19734 | 4/1999 |
| WO | WO 00/29855 | 5/2000 |

* cited by examiner

*Primary Examiner*—Hezron Williams
*Assistant Examiner*—Tamiko Bellamy
(74) *Attorney, Agent, or Firm*—Lisa K. Jorgenson; Harold H. Bennett, II; Seed IP Law Group, PLLC (57) ABSTRACT

An integrated gyroscope, including an acceleration sensor formed by: a driving assembly; a sensitive mass extending in at least one first and second directions and being moved by the driving assembly in the first direction; and by a capacitive sensing electrode, facing the sensitive mass. The acceleration sensor has an rotation axis parallel to the second direction, and the sensitive mass is sensitive to forces acting in a third direction perpendicular to the other directions. The capacitive sensing electrode is formed by a conductive material region extending underneath the sensitive mass and spaced therefrom by an air gap.

27 Claims, 6 Drawing Sheets

INTEGRATED GYROSCOPE OF SEMICONDUCTOR MATERIAL WITH AT LEAST ONE SENSITIVE AXIS IN THE SENSOR PLANE

CROSS-REFERENCE TO RELATED APPLICATION

This application is a continuation-in-part of U.S. patent application Ser. No. 10/128,133, filed Apr. 23, 2002, now U.S. Pat. No. 6,766,689, which application is incorporated herein by reference in its entirety.

BACKGROUND OF THE INVENTION

1. Field of the Invention

The present invention relates to an integrated gyroscope of semiconductor material.

2. Description of the Related Art

As is known, integrated gyroscopes of semiconductor material, manufactured using MEMS (Micro-Electro-Mechanical Systems) technology, operate on the basis of the theorem of relative accelerations, exploiting Coriolis acceleration. In particular, when a linear velocity is applied to a movable mass rotating with angular velocity, the movable mass "feels" an apparent force, called Coriolis force, which determines a displacement thereof in a direction perpendicular to the linear velocity and to the axis of rotation. The apparent force can be hence detected by supporting the movable mass through springs which enable a displacement thereof in the direction of the apparent force. On the basis of Hooke's law, this displacement is proportional to the apparent force itself and, thus, detection of the displacement of the movable mass enables detection of Coriolis force and, hence, of the angular velocity.

In gyroscopes of the type considered, the displacement of the movable mass is detected capacitively, by measuring at resonance the variations in capacitance caused by the movement of movable detection electrodes integrally fixed to the movable mass and interfaced with, or comb-fingered to, fixed detection electrodes.

Examples of embodiment of integrated gyroscopes manufactured using MEMS technology are described, for example, in U.S. Pat. Nos. 5,604,312, 5,275,047 and WO 97/15066 in the name of Robert Bosch GmbH, and in U.S. Pat. No. 5,955,668, WO 99/19734 and WO00/29855 in the name of IRVINE SENSORS CORPORATION. However, the above gyroscopes present some drawbacks.

For example, U.S. Pat. No. 5,604,312 describes a gyroscope formed by an oscillating mass and a sensitive mass mounted upon the driving element. This known gyroscope involves a complicated fabrication process, which uses two different structural layers, with consequent high fabrication costs, low reliability, complication of alignment between the accelerometers and the oscillating masses, and complication in the connections.

U.S. Pat. No. 5,955,668 and WO 99/19734 provide for an external oscillating mass connected to an internal sensing mass and, i.e., two independent mechanical parts which can be appropriately calibrated. However, in case of the gyroscope of circular shape (described in the patent U.S. Pat. No. 5,955,668), the structure is sensitive to stresses due to the fabrication steps and to thermal drift, since the suspension springs of the sensing element internal to the oscillating external mass are very rigid in the direction of the axis of the angular velocity, and it is not possible to anchor the detection element centrally, in so far as the gyroscope would "feel" the velocity of a number of axes simultaneously and would become unusable. Instead, for the gyroscope of rectangular shape (described in the patent WO 99/19734), the system is not optimized since it uses suspension springs which involve undesired rotational contributions; moreover, the described gyroscope does not enable rejection of linear accelerations. In either case, but in particular in case of a translation gyroscope, numerous interconnections are present which pass underneath the mass, and the interconnections are quite long, with the risk of capacitive couplings with the sensing structures and hence of false or imprecise reading.

BRIEF SUMMARY OF THE INVENTION

According to an embodiment of the present invention, an integrated gyroscope of semiconductor material is provided, including an acceleration sensor having a driving assembly and a sensitive mass. The mass extends in a first direction and a second direction and is moved by the driving assembly in the first direction. The sensor further includes a capacitive sensing electrode, facing the sensitive mass. The acceleration sensor has a rotation axis parallel to the second direction, and the sensitive mass is sensitive to forces acting in a third direction perpendicular to the first and second directions.

The capacitive sensing electrode comprises a conductive material region extending underneath and at a distance, in the third direction, from the sensitive mass. The driving assembly has a driving element connected to the sensitive mass through a mechanical linkage, which enables a movement of at least to part of the sensitive mass in the third direction. The sensitive mass and the capacitive sensing electrode have a reciprocal facing area that is constant in presence of movements of the sensitive mass in the first direction or in said second direction, thus only movements of the sensitive mass in the third direction are detected.

According to another embodiment of the invention, a method of operation is provided, including oscillating a sensing mass in a first axis lying in a first plane relative to a surface of a semiconductor material body, the sensing mass mechanically couple to the body, moving the semiconductor material body about a second axis perpendicular to the first axis and lying in the same plane, and detecting the movement of the semiconductor material body by detecting changes in a capacitive coupling between the sensing mass and an electrode formed on the surface of the semiconductor body, due to movements of the body in an axis perpendicular to the first plane.

BRIEF DESCRIPTION OF THE SEVERAL VIEWS OF THE DRAWINGS

For an understanding of the present invention, preferred embodiments thereof will now be described, purely by way of non-limiting example, with reference to the annexed drawings, wherein.

DETAILED DESCRIPTION OF THE INVENTION

U.S. patent application Ser. No. 10/128,133, filed on Apr. 23, 2002 and incorporated herein in its entirety, describes an integrated gyroscope comprising a sensor formed by a driving system, a sensitive mass and a mechanical linkage. The driving system is formed by a driving element having an open concave shape, and subject to a linear velocity directed in a first direction. The sensitive mass is also movable in a second direction perpendicular to the first direction and carries movable sensing electrodes. The mechanical linkage connects the driving elements to the sensitive mass. The gyroscope is sensitive to rotation about a third axis perpendicular to the former two and to the plane of the sensitive mass. The sensitive mass is surrounded on three sides by the driving element and has a peripheral portion not facing the latter. The movable sensing electrodes extend from the peripheral portion of the sensitive mass, not facing the driving element, and are comb-fingered to the fixed sensing electrodes. Thereby, there are no through electrical connections extending beneath the sensitive mass. In addition, the mechanical linkage is formed by springs arranged at equal distances with respect to the centroid of the sensitive mass, and the gyroscope is anchored to the substrate through anchoring springs arranged at equal distances with respect to the centroid of the ensemble formed by the driving system and the sensitive mass.

This previous gyroscope enables detection of the Coriolis force acting parallel to the second direction, in the sensor plane, and due to a rotation about an axis (hereinafter referred to as "sensitive axis") extending in the third direction, perpendicular to the sensor plane. By setting two gyroscopes rotated by 90° one with respect to the other on an appropriate board, it is possible to detect the apparent forces acting along two Cartesian axes parallel to the plane of the gyroscope, and hence the corresponding angular accelerations. It is not, however, possible to detect the apparent force and the corresponding angular acceleration along the third Cartesian axis, since in this case the third gyroscope should be mounted perpendicular to the board.

Figure 1:
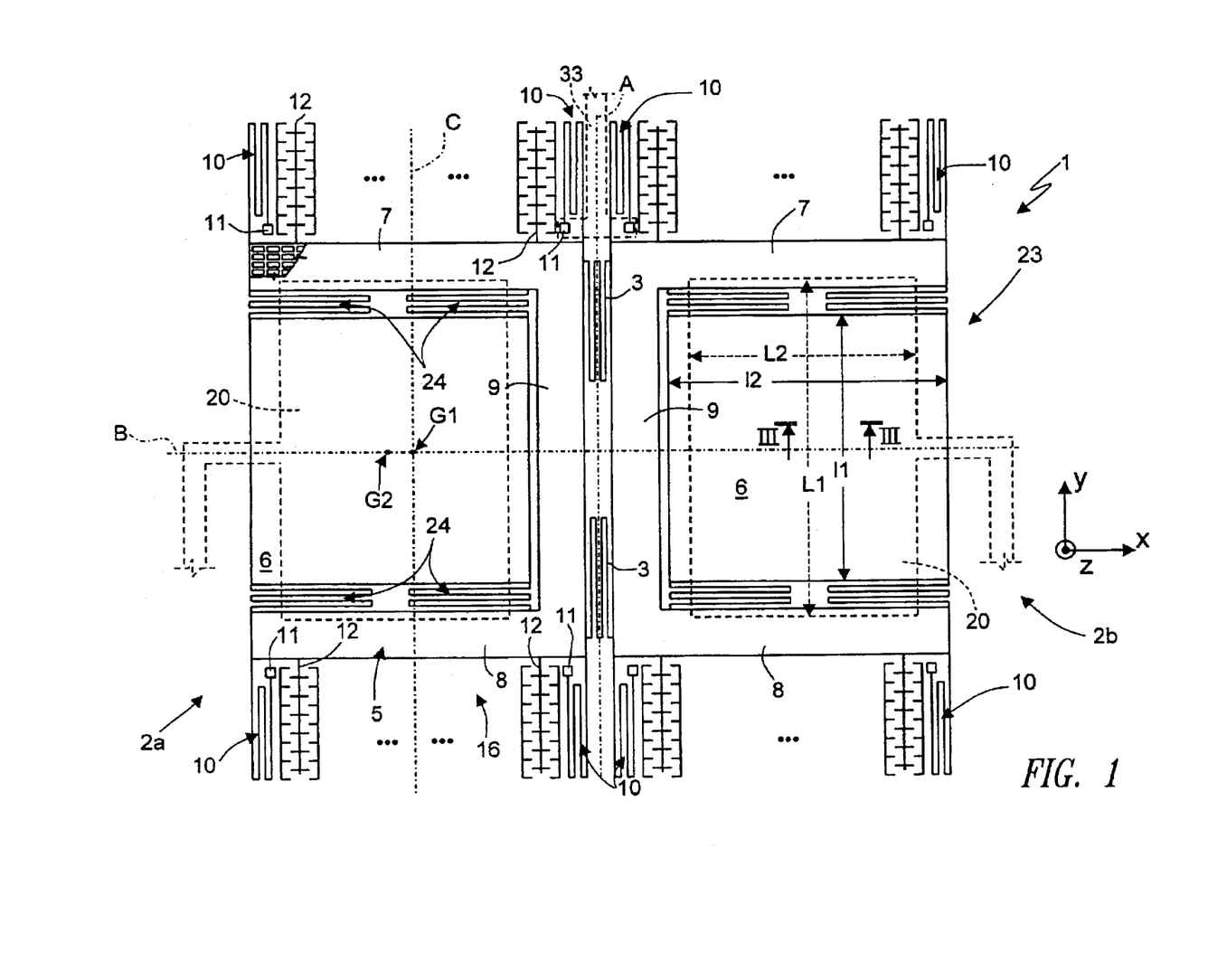
FIG. 1 is a top plan view through the first embodiment, with single sensitive axis.
Figure 2:
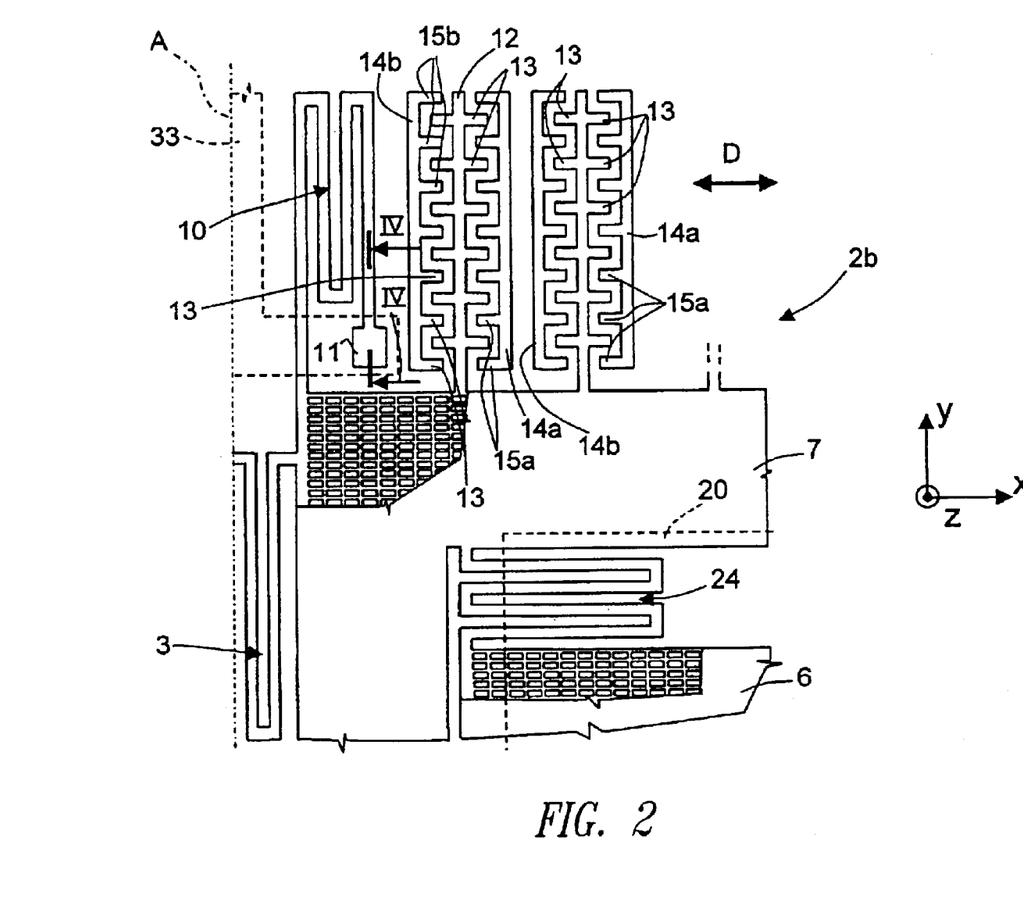
FIG. 2 illustrates a portion of the gyroscope of FIG. 1, at an enlarged scale.
Figure 3:
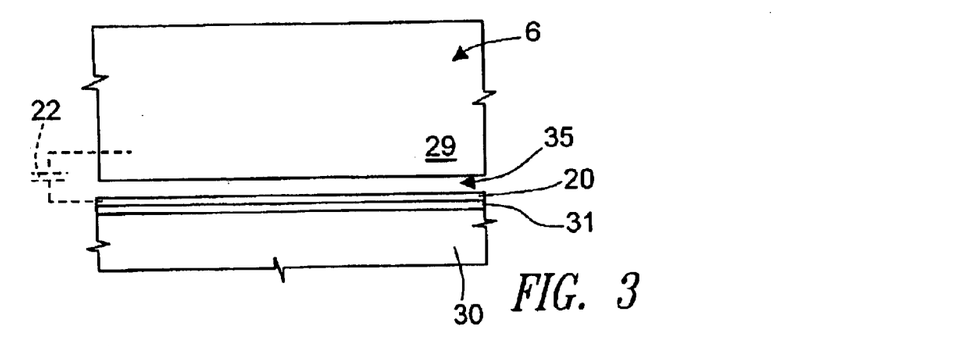
FIG. 3 is a cross-section taken along line III—III of FIG. 1.

FIGS. 1 to 3 illustrate a gyroscope 1 according to a first embodiment of the invention. As shown in detail in FIG. 1, the gyroscope 1 comprises an acceleration sensor 23 formed by two parts 2a, 2b, which are symmetrical with respect to a central axis of symmetry designated by A and connected together by two central springs 3, configured to be symmetrical with respect to a horizontal centroidal axis designated by B. Furthermore, each part 2a, 2b has a vertical centroidal axis designated by C. The axes A and C are parallel to the axis Y, while the axis B is parallel to the axis X. The intersection between the horizontal centroidal axis B and the vertical centroidal axis C constitutes the centroid G1 of each part 2a, 2b.

The acceleration sensor 23 is sensitive to an angular velocity directed parallel to the axis Y.

Each part 2a, 2b comprises a driving element 5 of concave shape, here a square C shape, and a sensitive mass 6, completely housed inside the space delimited by the driving element 5 but having a peripheral portion not facing the driving element 5 itself. Both the driving element 5 and the sensitive mass 6 are perforated as shown only in part in FIG. 2.

Each driving element 5 is formed by a first and a second oscillating arms 7, 8, which are parallel to one another and are connected at one end by a central cross member 9 extending perpendicular to the oscillating arms 7, 8. The two cross members 9 of the parts 2a, 2b extend parallel to one another, face one another, and are connected by the central springs 3. The first oscillating arms 7 are aligned together, as also are the second oscillating arms 8.

Anchoring springs 10 extend from each end of the oscillating arms 7, 8 towards the outside of the respective driving elements 5. The anchoring spring 10, which can be seen more clearly in the detail of FIG. 2, are of a folded type, i.e., they comprise at least two non-aligned portions, one connected to the respective driving element 5 and one having an anchoring end 11 fixed to a fixed substrate (as described in greater detail hereinafter with reference to FIG. 3). The anchoring springs 10 are equal and are arranged in pairs symmetrically with respect to the centroidal vertical axis C and the centroidal horizontal axis B, so that the anchoring springs 10 are at equal distances from one another and balanced with respect to the centroid G1 of the respective part 2a, 2b of the gyroscope. The anchoring springs 10 are here made up of four portions extending orthogonally to the arms 7, 8 and connected, in pairs, via short connection portions at their ends.

Elongated expansions, hereinafter referred to as movable driving arms 12, extend towards the outside of the oscillating arms 7, 8, orthogonally to the arms, between pairs of anchoring springs 10, symmetrically with respect to both the centroidal horizontal axis B and the centroidal vertical axis C. Each movable driving arm 12 carries a plurality of movable driving electrodes 13, extending orthogonally from either side of the respective movable driving arms 12.

Associated to each movable driving arm 12 is a first and a second fixed driving arms 14a, 14b (see FIG. 2), which are parallel to the movable driving arms 12 and carry respective fixed driving electrodes 15a, 15b. The fixed driving electrodes 15a, 15b extend perpendicular to the fixed driving arms 14a, 14b towards the respective movable driving arms 12 and are comb-fingered to the movable driving electrodes 13. The first fixed driving arms 14a are arranged all on a same side of the respective movable driving arms 12 (in the example, on the right) and are all biased at a same first potential. Likewise, the second fixed driving arms 14b are all arranged on the other side of the respective movable driving arms 12 (in the example, on the left) and are all biased at a same second potential. For example, it is possible to use a push-pull biasing scheme.

The driving element 5, the movable driving arms 12, the movable driving electrodes 13, the fixed driving arms 14a, 14b, and the fixed driving electrodes 15a, 15b together form a driving system 16 for each part 2a, 2b.

The sensitive mass 6 has a basically plane shape, with the main extension in the direction of the axes X and Y. In the example illustrated, each sensitive mass 6 is rectangular in shape, with the length 11 in the Y direction, the width 12 in the X direction, and with a centroid G2, and is surrounded on three sides by the respective driving element 5.

Four coupling springs 24, of a folded type, extend between each sensitive mass 6 and the oscillating arms 7, 8 facing said mass 6, in a position symmetrical with respect to the centroid G2 of the sensitive mass 6.

The coupling springs 24 (see also FIG. 2) extend mainly parallel to the oscillating arms 7, 8 and are configured so as to connect rigidly the sensitive mass 6 to the driving element 5 in a direction parallel to the axis X, to enable a limited movement of the sensitive mass 6 in the event of application of a force in the direction parallel to the axis Y, as explained hereinafter, and to enable its displacement in a direction parallel to the axis Z under the action of the apparent force due to Coriolis acceleration.

Underneath each sensitive mass 6, there extends a sensing electrode 20 of deposited doped polycrystalline silicon (for example, polysilicon deposited by low-pressure chemical vapor deposition LPCVD), the perimeter of the sensing electrode 20 being represented by a dashed line in FIG. 1.

As may be seen from FIG. 3, each sensitive mass 6 is separated from the respective sensing electrode 20 by an air gap 35 obtained by removal of a sacrificial material, such as deposited oxide. The sensitive mass 6 and the sensing electrode 20 thus form the plates of a capacitor 22 (represented by dashed lines in FIG. 3), the dielectric whereof is formed by the air gap 35.

Each sensing electrode 20, of rectangular shape, has a length L1 in the Y direction that is greater than the length l1, and a width L2 in the X direction that is smaller than the length l2 of the respective sensitive mass 6. In particular, the length L1 of the sensing electrode 20 exceeds the length l1 of the sensitive mass 6 by an amount such that any displacement in the direction Y of the sensitive mass 6 (due to forces acting in that direction) will not reduce the facing area between the sensitive mass 6 and the sensing electrode 20. In addition, the width L2 of the sensing electrode 20 is smaller than the width l2 of the sensitive mass 6 by an amount such that any displacement of the latter in the direction X (due to the driving system 16 and/or to other forces acting in that direction) will not reduce the facing area between the sensitive mass 6 and the sensing electrode 20. In this way, capacitive coupling between the sensitive mass 6 and the sensing electrode 20 does not change following upon movements in the directions X and Y; instead, it does change for movements along the axis Z, as described below.

FIG. 3 shows a cross-section through the gyroscope 1. As may be noted, the sensitive mass 6 (as also the driving element 5, the springs 10, 24, the movable driving arms 12, and the fixed driving arms 14a, 14b) is formed in a structural layer, here constituted by an epitaxial layer 29 formed on top of a substrate 30 of monocrystalline silicon. The sensing electrode 20 is formed on top of an insulating layer 31, for example, a deposited oxide layer, which is, in turn, formed on top of the substrate 30.

Figure 4:
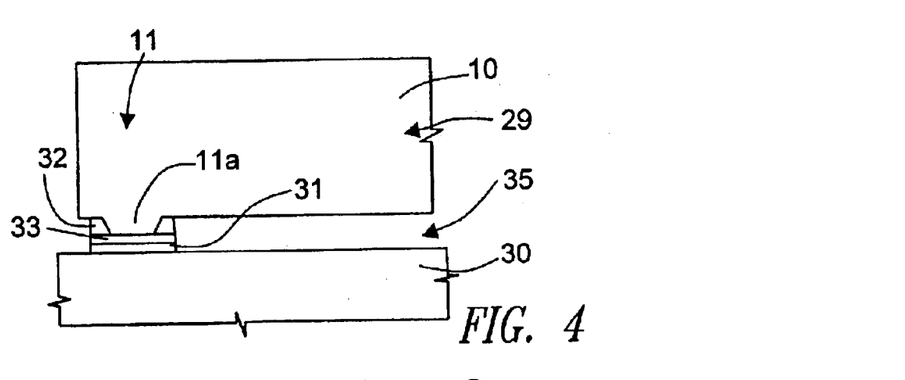
FIG. 4 is a cross-section taken along the line IV—IV of FIG. 2.

FIG. 4 shows the cross-section of the gyroscope 1 at one anchoring end 11 of an anchoring spring 10. In particular, the anchoring end 11 has, at the bottom, a reduced portion 11a overlying, and in direct electrical contact with, a first connection region 33 of conductive material, formed in the layer of polycrystalline silicon of the sensing electrode 20 and indicated by a dashed line in FIG. 1. The first connection region 33 enables biasing of the anchoring spring 10 and, more in general, of the driving element 5 and of the sensitive mass 6 at the desired potential. FIG. 4 also shows the non-removed portions 32 of a sacrificial layer, which, where removed, forms the air gap 35. In FIG. 4, the insulating layer 31 and the sacrificial layer 32 extend only underneath the anchoring end 11, and have been removed underneath the movable parts (here the anchoring spring 10). Similar solutions of connection are used for the fixed driving elements 14a, 14b, where, however, the sacrificial area 22 is not generally removed.

The gyroscope 1 is able to detect the magnitude of the angular velocity which causes a rotation of the gyroscope about the axis Y and hence in the plane of the sensitive mass 6. In this situation, in fact, as explained previously, the Coriolis force is directed along the axis Z and causes a displacement of the sensitive mass 6 in the same direction. Since the capacitance of the capacitor 22 formed by the sensitive mass 6 and by the sensing electrode 20 depends, in a known way, upon the distance between the plates, a special processing circuit (not shown) is able to detect the variation in capacitance and to find the magnitude of the angular velocity.

Thanks to the sizing, described above, of the sensitive mass 6 and of the sensing electrode 20, it is moreover possible to reject any accelerations or forces lying in the plane of the sensitive mass 6 and parallel to the axis Y In fact, as indicated, the forces acting in the direction Y do not determine a modification of the facing area between the plates of the capacitor 22 and hence of its capacitance, and are not felt by the circuitry associated to the gyroscope 1.

In this way, if two gyroscopes 1 of the type described are available in a single chip, the two gyroscopes being rotated through 90° (one with driving direction parallel to the axis X and the other with driving direction parallel to the axis Y) and hence having two sensitive axes in the plane of the sensitive mass 6, but staggered by 90° with respect to one another, and if, moreover, there is available a gyroscope of a known type on the same chip, this gyroscope having a sensitive axis perpendicular to the plane of the sensitive mass 6, it is possible with a single device to detect the angular velocities along all three Cartesian axes.

The gyroscope 1 has a high sensitivity thanks to the large facing area between the sensitive mass 6 and the sensing electrode 20 and supplies an output of a single-ended type.

Figure 5:
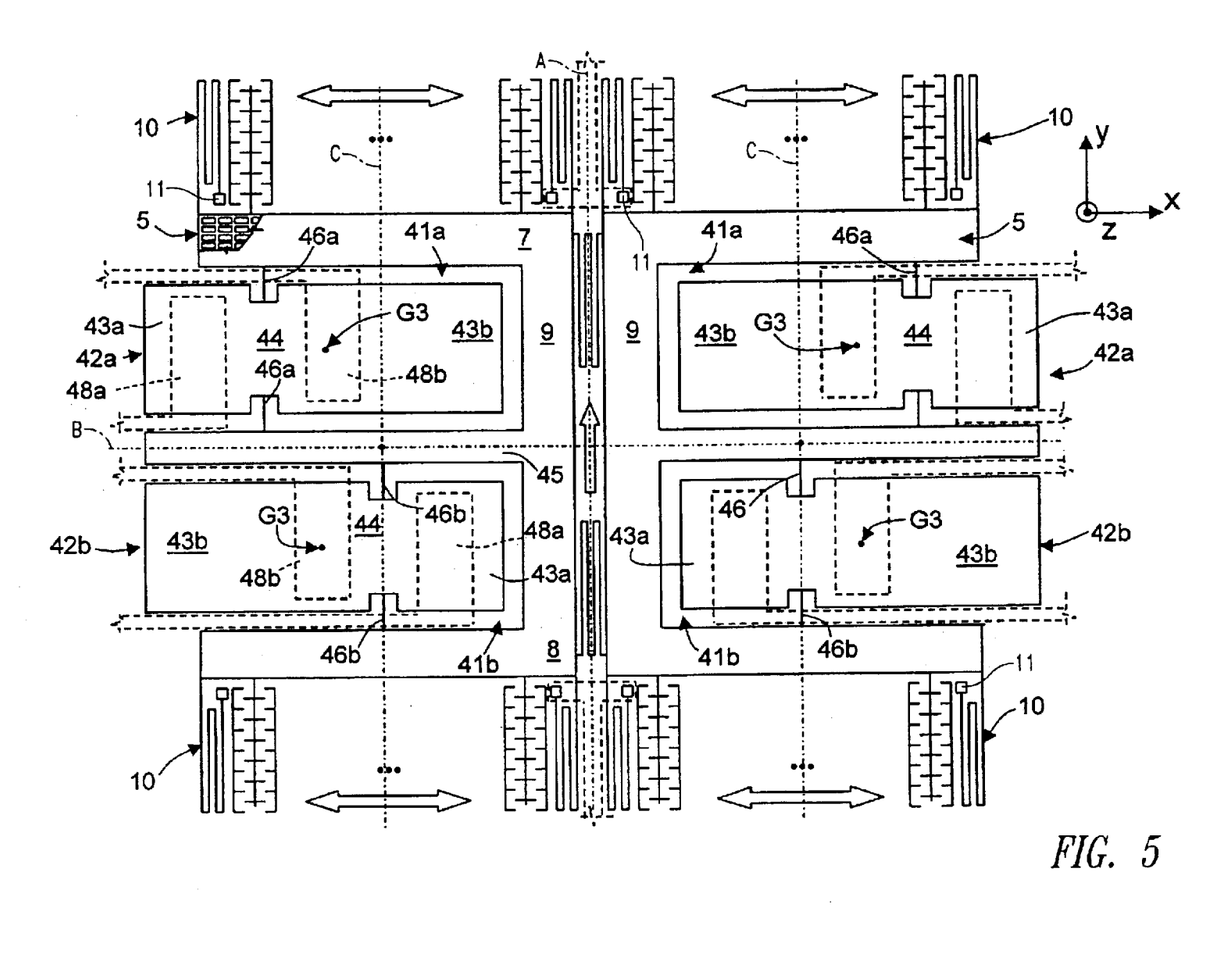
FIG. 5 is a top plan view through a second embodiment of the invention, with single sensitive axis.

FIG. 5 illustrates an embodiment of a gyroscope 40, which supplies a differential reading of the angular velocity.

The gyroscope 40 of FIG. 5 still comprises a driving system 16 of the type described with reference to FIG. 1, but each driving element 5 is here E-shaped and is provided with two concavities 41a, 41b facing outwards. In practice, each driving element 5 comprises, in addition to the oscillating arms 7, 8 and the central cross member 9, an intermediate arm 45, extending parallel to the axis X. Each driving element 5 is also here supported and biased through an anchoring spring 10 of a folded type, the springs having an anchoring end 11 and being arranged symmetrically with respect to the vertical centroidal axis C.

A sensitive mass 42a, 42b arranged inside each concavity 41a, 41b has a generally rectangular shape and is supported in an eccentric way. In detail, each sensitive mass 42a, 42b is formed by a first smaller rectangular portion 43a and a second larger rectangular portion 43b, these portions being interconnected by a narrow portion 44. Each sensitive mass 42a, 42b has an own centroid G3.

The sensitive mass 42a is supported by two supporting arms 46a extending parallel to the cross member 9 from the narrow portion 44 towards the oscillating arm 7 and towards the intermediate arm 45. Likewise, the sensitive mass 42b is supported by two supporting arms 46b extending parallel to the cross member 9 from the narrow portion 44 towards the oscillating arm 8 and towards the intermediate arm 45. The supporting arms 46a and 46b form torsion springs.

The supporting arms 46a of each sensitive mass 42a are aligned together, as are the supporting arms 46b of each sensitive mass 42b, but, in each part 2a, 2b, the supporting arms 46a of the sensitive mass 42a are misaligned with respect to the supporting arms 46b of the sensitive mass 42b. All of the supporting arms 46a, 46b extend at a distance from the centroid G3 of the respective sensitive mass 42a, 42b. Also here the suspended masses 42a, 42b of the two parts 2a, 2b of the gyroscope 40 are arranged symmetrically with respect to the central axis of symmetry A.

Respective sensing electrodes 48a, 48b extend underneath each portion 43a, 43b of the four suspended masses 42a, 42b. In detail, the sensing electrodes 48a face the smaller portions 43a, and the sensing electrodes 48b face the larger portions 43b. Also here the sensing electrodes 48a, 48b are formed by a polycrystalline silicon layer, separated from the respective portion 43a, 43b by an air gap, and are connected to a processing circuit (not shown).

Figure 6:
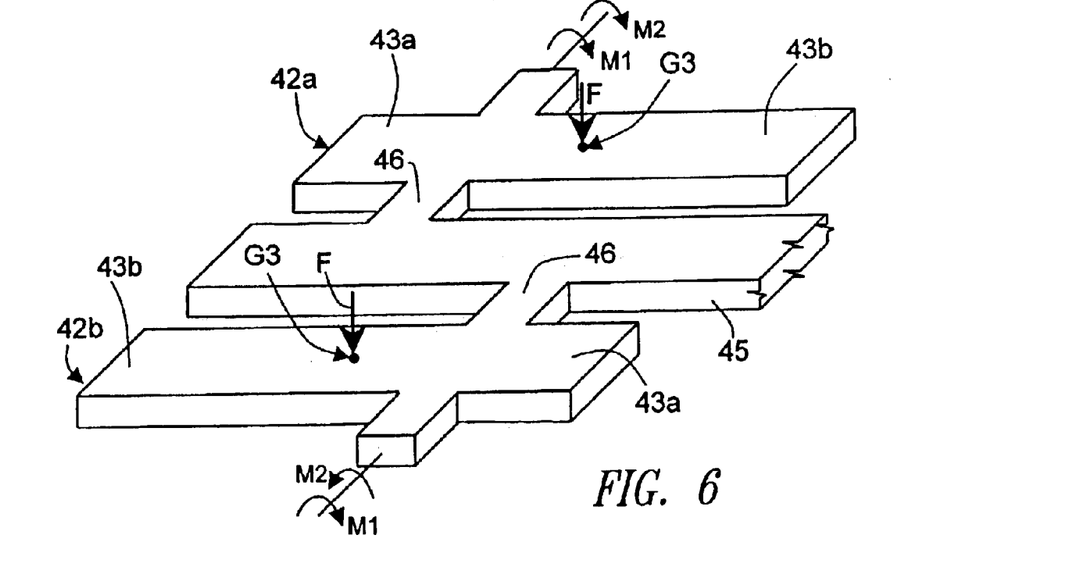
FIG. 6 is a schematic illustration in perspective view of a detail of FIG. 5.

In the gyroscope 40 of FIG. 5, as illustrated in FIG. 6, the Coriolis force F acting on the centroid G3 of each sensitive mass 42a, 42b determines opposite rotations of the suspended masses 42a, 42b connected to a same driving element 5, since they have the centroid G3 on opposite sides with respect to the respective supporting elements 46a, 46b. This rotation determines an opposite variation in the capacitance of the capacitors formed by each portion 43a, 43b of the suspended masses 42a, 42b and the respective sensing electrode 46a, 46b.

With the structure described, it is possible to eliminate the influence of external momenta acting on the suspended masses 42a, 42b. In fact, as shown in the simplified diagram of FIG. 6 and as explained above, the couple generated by the Coriolis force F, designated by M2, has the same value, but opposite sign, in the two accelerometers 42a, 42b carried by the same driving element 5. In particular, the couple M2 cause the more massive larger portions 43b of the suspended masses 42a, 42b to drop downward or rise upward together as they rotate in opposite directions about their respective support elements 46a, 46b. This results in opposite-polarity changes of the capacitance of the capacitors formed by the two accelerometers 42a, 42b and the respective sensing electrode 48a, 48b, and thus an opposite change in the signals supplied by the sensing electrodes 48a, 48b of each part 2a, 2b.

Instead, a possible external couple, designated by M1, acts in a concordant direction on both of the suspended masses 42a, 42b. In particular, the couple M1 will result in rotation of the suspended masses 42a, 42b about their respective supporting elements 46a, 46b in the same direction. This results in same-polarity changes of the capacitance of the capacitors formed by the two accelerometers 42a, 42b and the respective sensing electrode 48a, 48b, and thus a same change in the signals supplied by the sensing electrodes 48a, 48b of each part 2a, 2b.

Consequently, by subtracting the signals supplied by the sensing electrodes 48a, 48b of each part 2a, 2b of the gyroscope 40 from one another, the effect due to the external momentum M1 is cancelled, while the effect due to the Coriolis force is summed. In this way, it is possible to determine the magnitude of the angular velocity in the direction Y, eliminating the noise due to external momenta. In addition, a more symmetrical reading is obtained, which provides a non-negligible advantage during calibration and matching of the sensing resonance frequencies.

The gyroscope 40 illustrated in FIG. 5 is less sensitive than the gyroscope 1 of FIG. 1, since the variation in capacitance due to rotation of the suspended masses 42a, 42b is less than the variation that may be obtained as a result of translation in the direction Z of the suspended masses 6, given the same external force F. The gyroscope 40 is, however, less subject to electrostatic pull-in due to mechanical shocks. In fact, in the gyroscope of FIG. 1, on account of the biasing of the driving elements 5 and the sensing electrodes 20, it may happen that, following upon a mechanical shock, the driving elements 5 adhere to, and remain attracted by, the respective sensing electrodes 20, this being facilitated by the large facing area. Instead, with the gyroscope 40, a possible mechanical shock, such as might cause rotation of the suspended masses 42a, 42b, does not in general cause a condition of "sticking", given that in this case each sensitive mass 42a, 42b touches the respective sensing electrode 48a, 48b only along one edge instead of with the entire surface.

Figure 7:
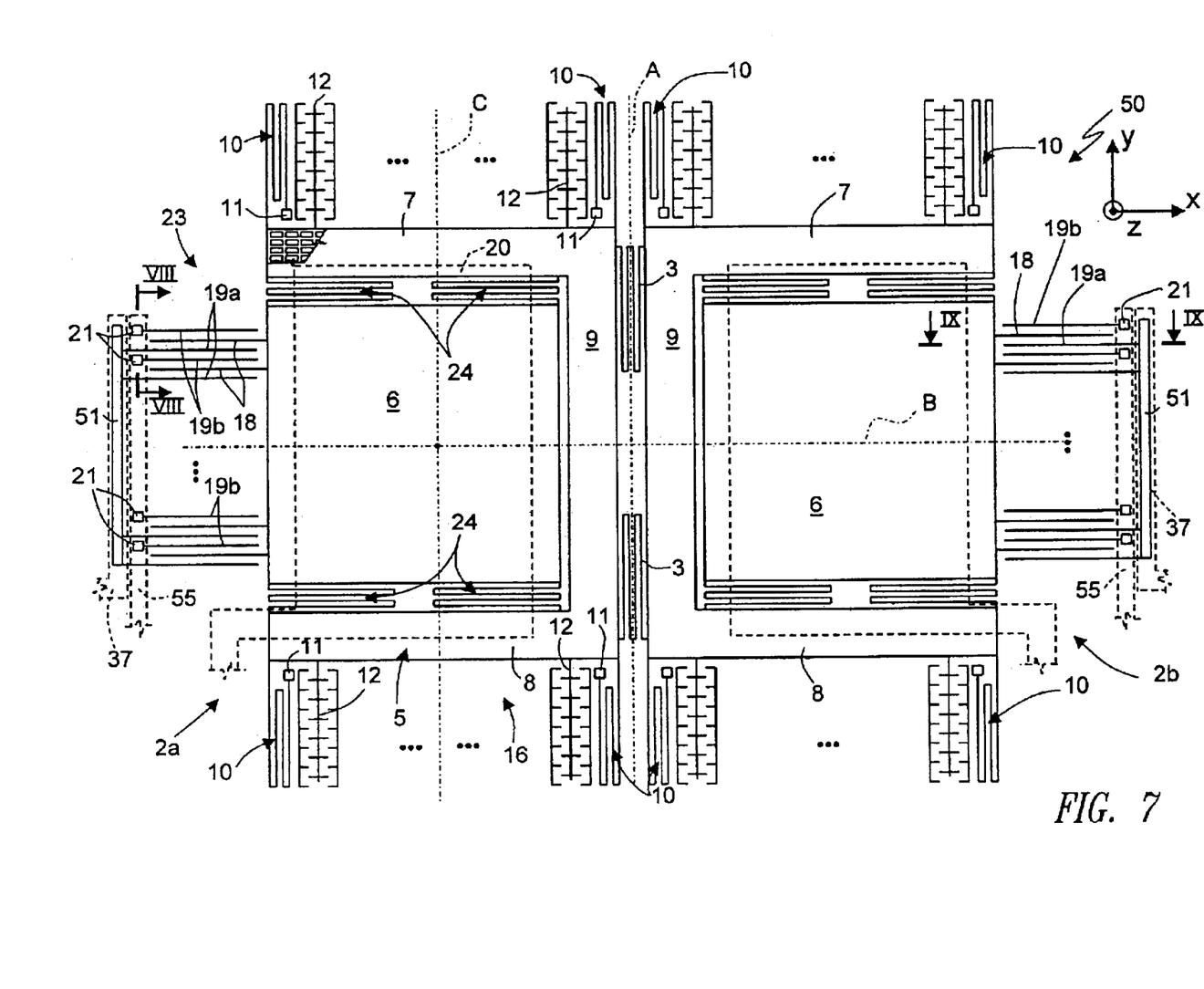
FIG. 7 is a top plan view through a third embodiment of the invention, with double sensitive axis.

FIG. 7 presents an embodiment of the gyroscope 50 with double sensitive axis. In particular, the gyroscope 50 has a first sensitive axis extending in the plane of the sensitive mass 6, parallel to the axis Y, as in the embodiment of FIG. 1, and a second sensitive axis extending in a direction perpendicular to the plane of the sensitive mass 6 and parallel to the axis Z.

The gyroscope 50 has a basic structure similar to that of the gyroscope 1 of FIG. 1, except for the fact that, in each part 2a, 2b, movable sensing electrodes 18 extend from the side of the sensitive mass 6 facing outwards, parallel to the oscillating arms 7, 8. The movable sensing electrodes 18 are comb-fingered to the fixed sensing electrodes 19a, 19b. In detail, each movable sensing electrode 18 is arranged between a fixed sensing electrode 19a and a fixed sensing electrode 19b. The fixed sensing electrodes 19a are all arranged on a first side of the movable sensing electrodes 18 and are electrically connected together at their outer ends through a first anchoring region 51. The fixed sensing electrodes 19b are all arranged on a second side of the movable sensing electrodes 18 and are electrically connected together through respective second anchoring regions 21 formed at their outer ends and connected together through a second connection region 55, represented by a dashed line in FIG. 7 and illustrated in FIG. 8.

The fixed sensing electrodes 19a, 19b form, with the movable sensing electrodes 18, capacitors, the capacitance of which depends upon the distance between them, in a known way. Consequently, any displacement in the direction Y of the sensitive mass 6, due to an oscillation around axis Z, causes a variation of opposite sign in the voltages of the fixed sensing electrodes 19a and 19b, which is detected and processed by an appropriate circuit (not shown) in a known way.

Figure 8:
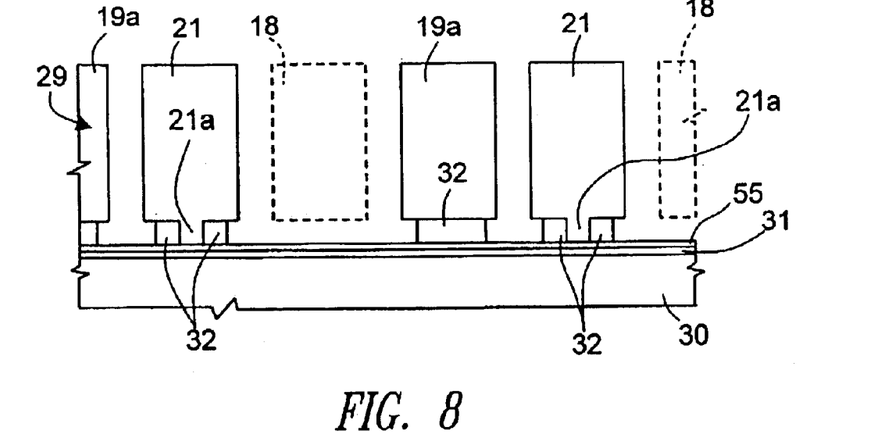
FIG. 8 is a cross-section taken along the line VIII—VIII of FIG. 7.

FIG. 8 is a cross-sectional view through the gyroscope at the second anchoring region 21 of the fixed sensing electrodes 19b. Here the second anchoring regions 21, which are formed in the same structural layer as the anchoring springs 10, i.e., the epitaxial layer 29, have at the bottom a reduced portion 21a formed by the epitaxial layer 29 itself, which overlies and is in direct electrical contact with the second connection region 55 formed in the same layer as the sensing electrodes 20 The second connection region 55 is formed on top of the insulating layer 31 and underneath the sacrificial layer 32, of which only some portions are visible, which have remained after the movable parts of the gyroscope 50 have been freed. The cross-section of FIG. 8 also shows the fixed sensing electrodes 19a and, in a plane set back with respect to the plane of the cross section, the movable sensing electrodes 18, drawn with a dashed line.

Figure 9:
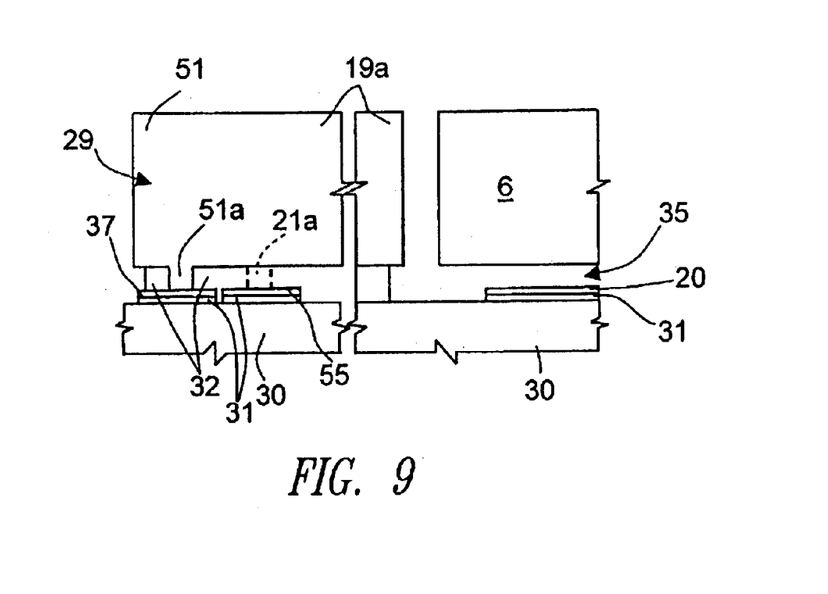
FIG. 9 is a cross-section taken along the line IX—IX of FIG. 7.

FIG. 9 is a cross-section through the gyroscope 50 taken along a fixed sensing electrode 19a. As may be noted, the first anchoring region 51 is formed in the epitaxial layer 29 and has, at the bottom, a reduced portion 51a formed by the epitaxial layer 29, which overlies and is in direct electrical contact with a third connection region 37 of conductive material, formed in the same layer as the sensing electrodes 20 and the second (polysilicon) connection region 55, on top of the insulating layer 31 and underneath the sacrificial layer 32.

The gyroscope 50 of FIGS. 7 to 9 is able to detect forces acting in the direction Z (sensitive axis parallel to the axis Y) as has been described with reference to FIG. 1. In addition, the gyroscope is able to detect forces acting in the direction of the axis Y (sensitive axis parallel to the axis Z), in so far as any displacement in the direction Y is detected as a variation in capacitance between the movable sensing electrodes 18 and the fixed sensing electrodes 19a, 19b.

In the gyroscope 50 it is possible to distinguish the effects of forces or of components thereof acting in the three directions. In fact, the displacements in the direction X (due to driving or to external forces) are not detected by the sensing electrodes 20, as mentioned with reference to FIG. 1, and cause a same capacitive variation on the fixed sensing electrodes 19a and 19b and can thus be rejected. The displacements along the axis Y are not detected by the sensing electrodes 20, as mentioned previously with reference to the embodiment of FIG. 1, but are detected by the fixed electrodes 19a and 19b, as explained above. The displacements along the axis Z are detected by the sensing electrode 20, as mentioned previously with reference to FIGS. 1–3. Their effect on the fixed sensing electrodes 19a and 19b can, instead, be rejected since they detect a same capacitive variation with respect to the movable sensing electrodes 18, as for the displacements in the direction X.

The advantages of the described gyroscope are the following. First, it is possible to have, on a single plane, the sensitive elements that are able to detect forces acting along three Cartesian axes, this enabling a reduction in the overall dimensions of a three-axes gyroscope. The advantage is all the greater in case of the third embodiment, where a single sensor 23 is able to measure forces acting in two perpendicular directions, and hence only two sensors are necessary for a three-dimension measure. The compactness of the sensors and the reduction in their number further enable reduction in costs for manufacturing the gyroscope.

Each sensor 23 and each sensing set is moreover sensitive only to the forces acting in the respective directions, and rejects actions in a perpendicular direction. Thus a high sensing precision is achieved. The sensing precision may be increased even further by designing the thicknesses of the various layers so as to assign different degrees of sensitivity in the different directions, in particular, in the third embodiment.

The first and the third embodiments have high sensitivity and hence are particularly suited in the case of low angular velocities; instead, the second embodiment, as mentioned previously, enables use of a simpler circuitry and makes it possible to avoid the risk of electrostatic pull-in.

Finally, it is clear that numerous modifications and variations may be made to the gyroscope described and illustrated herein, all falling within the scope of the invention as defined in the attached claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An integrated gyroscope, including an acceleration sensor comprising:
   a first driving assembly;
   a first sensitive mass extending in a first direction and a second direction, said first sensitive mass being moved by said driving assembly in said first direction;
   a first capacitive sensing electrode, facing said first sensitive mass, the first driving assembly, first sensitive mass, and first sensing electrode being components of a first part of the acceleration sensor;
   a second driving assembly;
   a second sensitive mass extending in the first direction and the second direction, said second sensitive mass being moved by said second driving assembly in said first direction; and
   a second capacitive sensing electrode, facing said second sensitive mass, the second driving assembly, second sensitive mass, and second sensing electrode being components of a second part of the acceleration sensor, symmetrical to the first part, the first and second driving assemblies being connected by central springs;
   wherein said acceleration sensor has a rotation axis parallel to said second direction, and said first and second sensitive masses are sensitive to forces acting in a third direction perpendicular to said first and second directions.

2. The gyroscope according to claim 1 wherein said first capacitive sensing electrode comprises a conductive material region extending underneath and at a distance, in said third direction, from said first sensitive mass.

3. An integrated gyroscope, including an acceleration sensor comprising:
   a sensitive mass extending in a first direction and a second direction,
   a driving assembly, said sensitive mass being moved by said driving assembly in said first direction, said driving assembly including a driving element connected to said sensitive mass through a mechanical linkage, which enables, at least to one part of said sensitive mass, a movement having a component in a third direction perpendicular to said first and second directions; and
   a capacitive sensing electrode, facing said sensitive mass;
   wherein said acceleration sensor has a rotation axis parallel to said second direction, and said sensitive mass is sensitive to forces acting in the third direction.

4. The gyroscope according to claim 3 wherein said sensitive mass can be translated parallel to said third direction.

5. The gyroscope according to claim 4 wherein said sensitive mass and said capacitive sensing electrode have a reciprocal facing area that is constant in presence of movements of said sensitive mass in said first direction or in said second direction.

6. The gyroscope according to claim 4 wherein said driving element surrounds, at least partially, said sensitive mass, said sensitive mass and said capacitive sensing electrode having a rectangular shape, a first one between said sensitive mass and said capacitive sensing electrode having a length in said first direction greater than another one between said sensitive mass and said capacitive sensing electrode, and a second one between said sensitive mass and said capacitive sensing electrode having a length in said second direction greater than another one between said sensitive mass and said capacitive sensing electrode.

7. The gyroscope according to claim 3 wherein said driving element has an open concave shape partially surrounding said sensitive mass, and said sensitive mass has a peripheral portion not facing said driving element.

8. The gyroscope according to claim 7, further comprising movable sensing electrodes extending from said peripheral portion of said sensitive mass in said first direction, said movable sensing electrodes being comb-fingered to fixed sensing electrodes for detecting movements of said sensitive mass in said second direction.

9. The gyroscope according to claim 3 wherein said sensitive mass can turn about an eccentric axis parallel to said second direction.

10. The gyroscope according to claim 9 wherein said driving element surrounds at least partially said sensitive mass, said sensitive mass has a first centroid, and said mechanical linkage comprises a first pair of supporting arms aligned to one another and defining said eccentric axis, said supporting arms of said first pair extending between said driving element and said at least one sensitive mass, eccentrically with respect to said first centroid.

11. The gyroscope according to claim 10 wherein said driving element is E-shaped and comprises first and second oscillating arms and an intermediate arm extending parallel to said first direction, said sensitive mass extending between said first oscillating arm and said intermediate arm, a second sensitive mass extending between said second oscillating arm and said intermediate arm, having a second centroid and being supported by a second pair of supporting arms, said supporting arms of said second pair extending eccentrically with respect to said second centroid.

12. The gyroscope according to claim 11 wherein said supporting arms of said second pair are misaligned with respect to said supporting arms of said first pair.

13. The gyroscope according to claim 11 wherein said sensitive mass and said second sensitive mass have a generally rectangular shape and comprise a first portion that is smaller and a second portion that is larger, arranged on opposite sides with respect to the respective supporting arms, and wherein a differential sensing electrode faces a respective one of said first and second portions of said sensitive mass and said second sensitive mass.

14. The gyroscope according to claim 3 wherein said driving element and said sensitive mass are formed in a same structural layer.

15. The gyroscope according to claim 14 wherein said driving element and said sensitive mass extend on top of a conductive material body and are spaced therefrom by an air gap, and said capacitive sensing electrode is formed by a semiconductor material region extending on top of said conductive material body and insulated therefrom, said semiconductor material region extending beneath said air gap.

16. The gyroscope according to claim 3 wherein said driving assembly further comprises a plurality of movable driving electrodes extending from said driving element and comb-fingered to a plurality of fixed driving electrodes.

17. An integrated gyroscope, including an acceleration sensor comprising:
a driving assembly;
a sensitive mass extending in a first direction and a second direction, said sensitive mass being moved by said driving assembly in said first direction; and
a capacitive sensing electrode, facing said sensitive mass;
wherein said acceleration sensor has a rotation axis parallel to said second direction, and said sensitive mass is sensitive to forces acting in a third direction perpendicular to said first and second directions;
the gyroscope comprising two symmetrical parts connected by central springs and each including an own driving assembly, an own sensitive mass, and an own capacitive sensing electrode.

18. A device, comprising:
a semiconductor substrate;
an electrode formed in a first layer of the substrate;
a driving element, mechanically coupled to the substrate and configured to oscillate along a first axis lying in a first plane parallel to the first layer; and
a sensing mass, mechanically coupled to the driving element and capacitively coupled to the first electrode, formed in a second layer of the substrate, the sensing mass being configured to oscillate with the driving element along the first axis lying in the first plane parallel to the first layer, and further configured to move along a second axis perpendicular to the first layer in response to angular movements of the substrate about a third axis perpendicular to the first axis and lying in the first plane.

19. The device of claim 18, further comprising a processing circuit configured to detect a magnitude of angular velocity of the substrate about the third axis by detecting changes in the capacitive coupling of the sensing mass and the electrode.

20. The device of claim 18, said sensing mass being further configured to oscillate along said third axis in response to angular movements of the substrate about said second axis.

21. A device, comprising:
a semiconductor substrate;
a first, second, third, and fourth electrodes formed in a first layer of the substrate;
a first sensing mass, mechanically coupled to the substrate and capacitively coupled to the first and second electrodes, formed in a second layer of the substrate, the first sensing mass being configured to oscillate along a first axis lying in a first plane parallel to the first layer, and further configured to oscillate about a second axis lying in the first plane in response to forces acting along a third axis perpendicular to the first and second axes, the first sensing mass and first and second electrodes forming first and second sensing capacitors; and
a second sensing mass, mechanically coupled to the substrate and capacitively coupled to the third and fourth electrodes, formed in the second layer of the substrate, the second sensing mass configured to oscillate along the first axis lying in the first plane, and further configured to oscillate about a fourth axis, parallel to the second axis, in response to forces acting along the third axis; the second sensing mass and third and fourth electrodes forming third and fourth sensing capacitors.

22. The device of claim 21, further comprising a processing circuit configured to process signals from the first, second, third, and fourth sensing capacitors to separate forces acting on the device due to coriolis effect from forces acting on the device due to momenta.

23. A method, comprising:
oscillating a driving element in a first axis lying in a first plane relative to a surface of a semiconductor material body, the driving element mechanically couple to the body;
moving the semiconductor material body about a second axis perpendicular to the first axis and lying in the same plane; and detecting the movement of the semiconductor material body by detecting changes in a capacitive coupling between a sensing mass mechanically coupled to the driving body and an electrode formed on the surface of the semiconductor body, due to movements of the body in an axis perpendicular to the first plane.

24. A device, comprising:

a semiconductor material body;

a driving element coupled to the semiconductor material body and movable with respect to the semiconductor material body in a first axis;

a sensing mass mechanically couple to the driving element and movable with respect to the driving element in a second axis, perpendicular to the first axis; and a capacitive electrode positioned between the semiconductor material body and the sensing mass and configured to detect movement of the sensing mass in the second axis.

25. The device of claim 24 wherein the sensing mass is movable with respect to the driving element in a third axis, perpendicular to the first and second axes, the second axis being perpendicular to a face of the semiconductor material body, the device further comprising:

a plurality of sensing electrodes configured to detect movement of the sensing mass in the third axis.

26. The device of claim 24 wherein the driving element, sensing mass, and capacitive electrode are components of a first part of the device, the device further comprising:

a second part, symmetrical to the first part and coupled thereto by spring elements.

27. The device of claim 24 wherein the sensing mass is a first sensing mass and the capacitive electrode is a first capacitive electrode, the device further comprising:

a second sensing mass, the first and second sensing masses each being eccentrically, rotatably, coupled to the driving element, the first and second sensing masses configured to rotate around the second and a third axes, respectively, the second and third axes being parallel to each other; and second, third, and fourth capacitive electrodes, the first and second capacitive electrodes being positioned between the semiconductor material body and the first sensing mass, and the third, and fourth capacitive electrodes being positioned between the semiconductor material body and the second sensing mass.

* * * * *

US006928872C1

(12) EX PARTE REEXAMINATION CERTIFICATE (9903rd)
United States Patent
Durante et al.

(10) Number: US 6,928,872 C1
(45) Certificate Issued: Oct. 24, 2013

(54) INTEGRATED GYROSCOPE OF SEMICONDUCTOR MATERIAL WITH AT LEAST ONE SENSITIVE AXIS IN THE SENSOR PLANE (75) Inventors: Guido Spinola Durante, Gavirate (IT); Sarah Zerbini, Fontanellato (IT); Angelo Merassi, Vigevano (IT)

(73) Assignee: STMicroelectronics S.R.L., Agrate Brianza (IT)

Reexamination Request:
No. 90/012,518, Sep. 12, 2012

Reexamination Certificate for:
Patent No.: 6,928,872
Issued: Aug. 16, 2005
Appl. No.: 10/443,647
Filed: May 21, 2003

Related U.S. Application Data (63) Continuation-in-part of application No. 10/128,133, filed on Apr. 23, 2002, now Pat. No. 6,766,689.

(30) Foreign Application Priority Data

Apr. 27, 2001 (EP) ..................................... 01830277
May 21, 2002 (EP) ..................................... 02425320

(51) Int. Cl.
*G01C 19/00* (2013.01)
*G01P 15/08* (2006.01)
*G01P 3/44* (2006.01)
*G01P 9/00* (2012.01)
*G01P 15/125* (2006.01)

(52) U.S. Cl.
USPC ..................................... 73/504.04; 73/514.32

(58) Field of Classification Search
None
See application file for complete search history.

(56) References Cited

To view the complete listing of prior art documents cited during the proceeding for Reexamination Control Number 90/012,518, please refer to the USPTO's public Patent Application Information Retrieval (PAIR) system under the Display References tab.

*Primary Examiner* — Tuan H Nguyen (57) ABSTRACT

An integrated gyroscope, including an acceleration sensor formed by: a driving assembly; a sensitive mass extending in at least one first and second directions and being moved by the driving assembly in the first direction; and by a capacitive sensing electrode, facing the sensitive mass. The acceleration sensor has an rotation axis parallel to the second direction, and the sensitive mass is sensitive to forces acting in a third direction perpendicular to the other directions. The capacitive sensing electrode is formed by a conductive material region extending underneath the sensitive mass and spaced therefrom by an air gap.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-27 is confirmed.

* * * * *